United States Patent [19]

Kawamoto et al.

[11] Patent Number: 5,978,563
[45] Date of Patent: *Nov. 2, 1999

[54] PRINT PROCESSING SYSTEM AND METHOD

[75] Inventors: Koushi Kawamoto; Hiroshi Ishikawa; Koji Adachi, all of Ashigarakami-gun, Japan

[73] Assignee: Fuji Xerox., Ltd., Tokyo, Japan

[*] Notice: This patent is subject to a terminal disclaimer.

[21] Appl. No.: 08/732,991

[22] Filed: Oct. 16, 1996

[30] Foreign Application Priority Data

Oct. 20, 1995 [JP] Japan ................................ 7-272239

[51] Int. Cl.⁶ ...................................... B41B 15/00
[52] U.S. Cl. .................... 395/117; 395/117; 395/112; 395/113; 395/114; 395/115; 395/101
[58] Field of Search .................... 395/117, 112, 395/101, 113, 114, 115

[56] References Cited

U.S. PATENT DOCUMENTS 5,333,246  7/1994  Nagasaka .............................. 395/163
5,768,489  10/1996  Adachi et al. .......................... 395/117

FOREIGN PATENT DOCUMENTS

1-A188374  7/1989  Japan .
4-A128068  4/1992  Japan .
6-A131338  5/1994  Japan .
6-A266514  9/1994  Japan .

OTHER PUBLICATIONS

Aho, A., et al. "Complilers Principles, Technique, and Tools", Addison–wesley 1986, pp. 96–125, 188–217.

*Primary Examiner*—Edward L. Coles
*Assistant Examiner*—Twyler Lamb
*Attorney, Agent, or Firm*—Oliff & Berridge, PLC

[57] ABSTRACT

Command sequences that form a meaningful unit in terms of syntax are integrated into drawing and environment contents corresponding to the type of command. Clusters are formed from the drawing contents and the environment contents required to process those drawing contents, and the clusters are assigned to processors, respectively. The assignment of the clusters to the processors is carried out on the basis of drawing loads and the efficient distribution of resource information. The processing results of the processors are recovered in the order in which the command sequences are produced, whereby the completeness of an image is assured.

13 Claims, 8 Drawing Sheets

DISTRIBUTION CRITERIA

PROVIDED THAT A CLUSTER OF CONTENTS ARE ASSIGNED TO A PROCESSING ELEMENT "d",
(1) OVERLAPS BETWEEN RESOURCES SPREADING ACROSS THE PES ARE SMALL (NAMELY, AS MANY PREDETERMINED RESOURCES AS POSSIBLE ARE ARRANGED IN THE SAME PE).
(2) INTERVALS BETWEEN JOBS IN EACH PE ARE UNIFORM.
(3) THE TOTAL PROCESSING TIME OF EACH PE IS UNIFORM.

$$[\Sigma C_R + \alpha \cdot \Sigma \sigma(t) + \beta \cdot \sigma(T)]\mid_d \rightarrow \min$$

PRINT PROCESSING SYSTEM AND METHOD

BACKGROUND OF THE INVENTION

1. Field of the Invention

The present invention relates to a print processing system and method which produce printed output by processing the print information described in print languages, such as page-description languages, using a plurality of image forming units.

2. Description of the Related Art

As development of a print system suitable for use in high-speed digital printing operations such as electrophotography or ink-jet printing operations, a print control scheme that breaks from conventional textual-information-oriented printing, that deals with images, graphics, characters, or the like, in the same manner, and that uses "page-description languages" capable of freely controlling the enlargement, reduction, rotation, and deformation of characters or graphics has achieved widespread use. Various page-description languages were developed during the 1980s. PostScript (a registered trademark of Adobe Systems in U.S.) and Interpress (a registered trademark of Xerox Corporation in U.S.) are representatives of the page-description languages. Various printers employ many page-description languages.

In a conventional page-description language processing print system, the central processing unit (CPU) of the print system sequentially interprets a page-description language, whereby a printer of the print system executes a printing operation. One example of the conventional page-description language processing print systems is disclosed in Unexamined Japanese Patent Application No. Hei 1-188374. The conventional page-description language processing print system is provided with a storage device that receives and stores a program for printing purposes (hereinafter referred to as print information) fed from a computer (hereinafter referred to as a host computer), a processor for sequentially interpreting that information, and a printing apparatus for executing a printing operation according to the thus-interpreted print information. After the print information has been transmitted from the host computer to the printing apparatus, the printing apparatus translates the print information and carries out a printing operation, whereby the load on the host computer is relieved. In consequence, the possessing speed of the overall print system is improved.

The sharing of a printing apparatus is standard practice in a decentralized network environment. Such a printing apparatus receives print requests from many host computers and must interpret and execute the print information described in a page-description language. Where many host computers concurrently use that printing apparatus, the printing apparatus serially interprets and executes the print information described in the page-description language, which results in a longer wait time elapsing between requesting and receiving print output.

To solve the foregoing problem and process print information at high speed, several techniques have been proposed: for example, a multiprocessing print processing system (see, e.g., Unexamined Japanese Patent Application No. Hei 4-128068) that interprets and executes print information in a parallel manner by use of a plurality of processors which are tightly coupled through a bus, or a print processing system (see, e.g., U.S. Pat. No. 5,333,246) that interprets and executes print information in a parallel manner by means of a decentralized network consisting of a plurality of loosely-coupled processors.

In the print processing system disclosed in Unexamined Japanese Patent Application No. Hei 4-128068, a special processing is not carried out with regard to the division of print information in order to interpret and execute the print information in a parallel manner. The print information is simply split page by page. In the case of the print information whose print job consists of a plurality of pages, a processing time is reduced. However, in the case of the print information whose print comprises only one page, the effect of reducing the processing time is not achieved.

In the print processing system disclosed in U.S. Pat. No. 5,333,246, the overlap between images is detected with regard to the division of the print information in order to interpret and execute the print information in a parallel manner. The print information is split on "an image group basis which does not affect another image even if that image group is separated from the print information". The thus-split print information is subjected to parallel processing. In this case, even in the case of the print information whose print job consists of one page, the effect of reducing the processing time is achieved. Since the processing is executed on a split-image group basis, the time required to carry out the processing will become a bottleneck if some of the plurality of split image groups are very complicated, for example, if they comprise overlapping images. As a result, the processing time of the entire page is not frequently reduced.

Neither the technique disclosed in Unexamined Japanese Patent Publication No. Hei 4-128068 nor the technique disclosed in U.S. Pat. No. 5,333,246 takes into consideration the efficient arrangement of the resources necessary for the print information. Specifically, in the case where the processing of print information is shared between the plurality of print information processing apparatuses, many print processing apparatuses respectively hold the resource information required to carry out raster graphics processing of the print information such as font information. The holding of the same resource information of the print processing apparatuses in an overlapped manner results in considerable overhead in the print processing system, as is the case of memory locations, processing costs, and transmission costs. In an extreme case, as a result of the overhead, the parallel processing carried out by a plurality of print information processing apparatuses may become inferior to the ordinary processing carried out by a single print information processing apparatus. For this reason, the effect resulting from high-speed parallel processing will not be achieved unless the efficient arrangement of the resources required to print the print information is not taken into consideration.

SUMMARY OF THE INVENTION

The present invention has been conceived in consideration of the foregoing circumstances, and an object of the present invention is to provide a print processing system and method that renders the print processing of a plurality of processors more efficient by minutely splitting print information and efficiently distributing the resource information required to process thus-split print information when carrying out the print processing using tightly or loosely coupled processors.

To this end, according to a first aspect of the present invention, there is provided a print processing system that carries out raster graphics processing in order to obtain pixel information for printing purposes from a source file which includes print information written in a predetermined print control language, the print processing system comprising:

a plurality of arithmetic processing units that execute the raster graphics processing;

token analyzing means that analyzes tokens of the source file and produces a print information command stream;

syntax analyzing means that analyzes the syntax of the print information command stream and sequentially produces a command sequence so as to constitute a meaningful unit in terms of the syntax rule of the print language;

document syntax analyzing means that analyzes the stream of the command sequence and sequentially integrates one or a series of command sequences into environment contents including a command sequence for specifying a drawing environment or drawing contents including a command sequence for specifying a drawing operation;

resource attribute analyzing means that analyzes the streams of the environment contents and the drawing contents and determines the raster graphics resource required to execute the drawing contents;

print information splitting means that allocates the environment contents and the drawing contents to the plurality of arithmetic processing units on the basis of the raster graphics processing resources determined by the resource attribute analyzing means; and printing means that carries out a printing operation according to the results of the processing of the plurality of arithmetic processing units.

With this arrangement, the print information is handled in drawing and environment contents. The print information can be scheduled on the basis of the attribute of resources. The print information can be allocated to a plurality of arithmetic processing units so as to efficiently utilize information about the resources. Consequently, multiprocess print processing can be optimized.

In this case, the print information splitting means may be arranged so as to comprise load prediction means that predicts the time required for each arithmetic processing unit to process a command sequence group, and print information allocating means for allocating the command sequences to the plurality of arithmetic processing units on the basis of the processing time predicted by the load prediction means and the information about the raster graphics processing resources. By virtue of the above-described configuration, the print information can be efficiently assigned to the plurality of arithmetic processing units in terms of two factors; namely, a load associated with graphics processing and the effective utilization of resource information.

The print information splitting means may be arranged so as to comprise count storage means for counting the order of command sequences output from the syntax analyzing means; print information allocating means for allocating the command sequences to the plurality of arithmetic processing units together with the order information produced by the count storage means; and print image recovery means that recovers the results of the raster graphics processing and feeds them to the print means according to the order information attached to the command sequences when the command sequences are allocated to the arithmetic processing units after the processing of the allocated command sequences has been completed by the respective arithmetic processing units. By virtue of the above-described configuration, the order of command sequences used when image elements are drawn is still maintained by the time of generation of a final image even when image elements spatially overlap each other. As a result, an accurate image is formed.

The plurality of arithmetic processing units that carry out the raster graphics processing may be tightly coupled by means of shared memory or loosely coupled through a communications network.

To achieve the object of the present invention, according to a second aspect of the present invention, there is provided a pre-processing apparatus for use in a print processing system that carries out raster graphics processing in order to obtain pixel information for printing purposes from a source file which includes print information written in a predetermined print control language, the print processing system comprising:

token analyzing means that analyzes tokens of the source file and produces a print information command stream;

syntax analyzing means that analyzes the syntax of the print information command stream and sequentially produces a command sequence so as to constitute a meaningful unit in terms of the syntax rule of the print language;

document syntax analyzing means that analyzes the stream of the command sequence and sequentially integrates one or a series of command sequences into environment contents including a command sequence for specifying a drawing environment or drawing contents including a command sequence for specifying a drawing operation;

resource attribute analyzing means that analyzes the streams of the environment contents and the drawing contents and determines the raster graphics resource required to execute the drawing contents; and print information splitting means that allocates the environment contents and the drawing contents to the plurality of arithmetic processing units on the basis of the raster graphics resources determined by the resource attribute analyzing means.

To achieve the object of the present invention, according to a third aspect of the present invention, there is provided a computer program product that runs on a computer and enables a plurality of arithmetic processing units to carry out raster graphics processing in order to obtain pixel information for printing purposes from a source file which includes print information written in a predetermined print control language, the improvement being characterized by the fact that the computer program product causes the computer to execute the following steps of:

analyzing tokens of the source file and producing a print information command stream;

analyzing the syntax of the print information command stream and sequentially producing a command sequence so as to constitute a meaningful unit in terms of the syntax rule of the print language;

analyzing the stream of the command sequence and sequentially integrating one or a series of command sequences into environment contents including a command sequence for specifying a drawing environment or drawing contents including a command sequence for specifying a drawing operation;

analyzing the streams of the environment contents and the drawing contents and determining the raster graphics resource required to execute the drawing contents; and allocating the environment contents and the drawing contents to the plurality of arithmetic processing units on the basis of the raster graphics resources determined by the resource attribute analyzing means.

To achieve the object of the present invention, according to a fourth aspect of the present invention, there is provided a print processing method that enables a plurality of arithmetic processing units to carry out raster graphics processing in order to obtain pixel information for printing purposes from a source file which includes print information written in a predetermined print control language, the improvement being characterized by comprising the steps of:

analyzing tokens of the source file and producing a print information command stream;

analyzing the syntax of the print information command stream and sequentially producing a command sequence so as to constitute a meaningful unit in terms of the syntax rule of the print language;

counting the command sequences in the order in which they are produced;

analyzing the stream of the command sequence and sequentially integrating one or a series of command sequences into environment contents including a command sequence for specifying a drawing environment or drawing contents including a command sequence for specifying a drawing operation;

analyzing the streams of the environment contents and the drawing contents and determining the raster graphics processing resource required to execute the drawing contents;

determining the order of processing of the environment and drawing contents on the basis of the processing order that is decided with respect to the plurality of overlapping drawing contents and the raster graphics processing resource determined to be necessary to execute the drawing contents;

allocating the environment contents and the drawing contents to the plurality of arithmetic processing units on the basis of the raster graphics processing resources determined by the resource attribute analyzing means and the processing order determined by the dependency analyzing means; and recovering the results of the processing of the plurality of arithmetic processing units in the order of the count of the command sequences are counted and transmitting them to the print means.

BRIEF DESCRIPTION OF THE DRAWINGS

The above and other objects and features of the present invention will be more apparent from the following description taken in conjunction with the accompanying drawings.

DETAILED DESCRIPTION OF THE PREFERRED EMBODIMENTS

With reference to the accompanying drawings, a print processing system according to embodiments of the present invention will be described hereinbelow.

Figure 1:
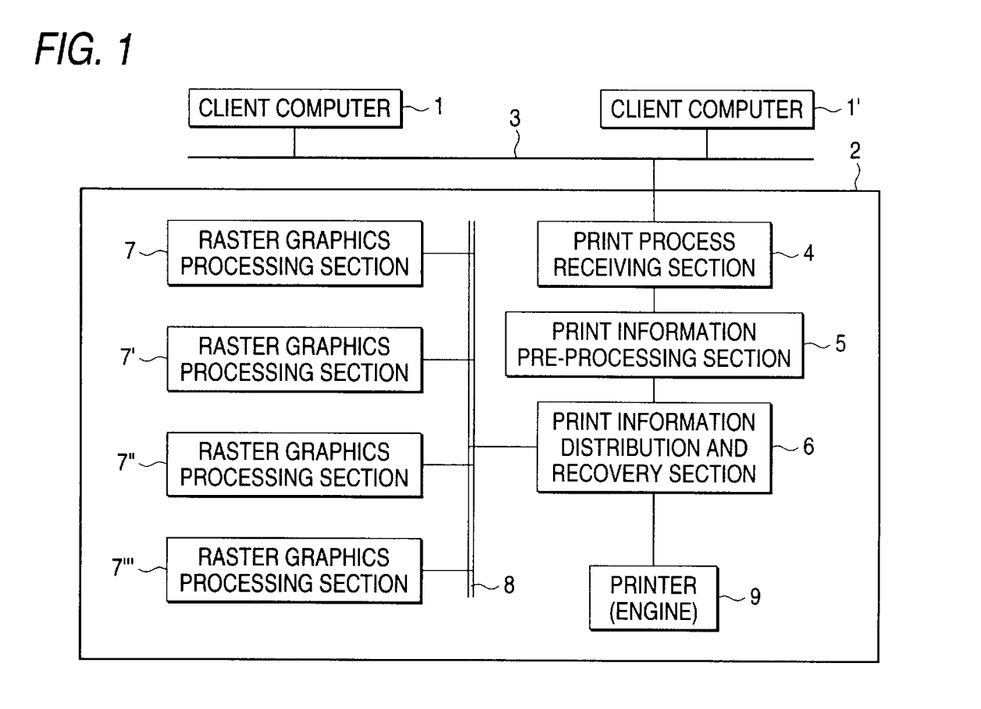
FIG. 1 is a block diagram of the configuration of a print processing system according to an embodiment of the present invention.

FIG. 1 is a diagrammatic representation of the exemplary configuration of a print processing system according to the first embodiment of the present invention. In the drawing, the print processing system of the present embodiment comprises a plurality of client computers (hereinafter referred to as host computers) 1, 1', . . . , and a print processing system 2 connected to the host computers 1, 1', . . . through a communications network 3.

Each of the host computers 1, 1', . . . is made up of a personal computer, a workstation, or the like. In the present invention, the host computers 1, 1', . . . are provided with a document preparation program (not shown). A print information file 5 prepared by the document preparation program is described in, e.g., PostScript. It may be written in another page-description language such as Interpress or a graphics command such as GDI (Graphics Device Interface which is a registered trademark of Microsoft Co., Ltd. in U.S.) or QuickDraw (Apple Corporation in U.S.).

The print processing system 2 produces printed output by subjecting the print information transmitted from the host computers 1, 1', . . . to raster graphics processing. The print processing system 2 comprises; for example, a print process receiving section 4, a print information pre-processing section 5, a print information distribution and recovery section 6, raster graphics processing sections 7, 7', 7", 7'", . . . , a shared bus 8, and a printer 9. Of these elements, the print process receiving section 4, the print information pre-processing section 5, the print information distribution and recovery section 6, and the raster graphics processing sections 7, 7', 7", 7'", . . . , are all implemented by software.

The print process receiving section 4 receives the print information transmitted from the host computers 1, 1', . . . and carries out temporary storing operations that are generally called spooling.

The print information pre-processing section 5 and the print information distribution and recovery section 6 constitute the primary elements of the present invention. These sections split the print information file and distribute the thus-split print information files to the plurality of arithmetic processing units (the raster graphics processing sections 7, 7', 7", 7'", . . . ) that carry out raster graphics processing.

The raster graphics processing sections 7, 7', 7", 7'", . . . , are made up of a plurality of arithmetic processing units for use in raster graphics processing that are coupled together by an internal bus. The print processing system of the present embodiment is provided with at least four arithmetic processing units. The raster graphics processing sections 7, 7', 7", 7'", . . . , are respectively provided with local memory which is necessary execute raster graphics processing. This raster graphics processing is carried out in accordance with the performance of the printer 9 (e.g., a resolution, color reproducing characteristics, a gradation, a recording size, etc.).

The printer 9 is a laser-scan color page printer that employs electrophotography and is capable of outputting a full-color image through repetition of exposure, development, and transfer operations for each of the four primary colors, or CMYK (cyan, magenta, yellow, and black). Specifications related to the performance of this color page printer are as follows: for example, a A3-recording size, 400-dpi (dot per inch) resolution, and an 8-bit gradation for every color. In the present embodiment, the raster image memory comprises at least 128 megabytes (MB).

Although the print information pre-processing section 5 that constitutes the principal elements of the present invention is contained in the print processing system 2 in the present embodiment, it is not limited to such a configuration. Means for carrying out similar processing may be incorporated in the host computers 1, 1', . . . .

Figure 2:
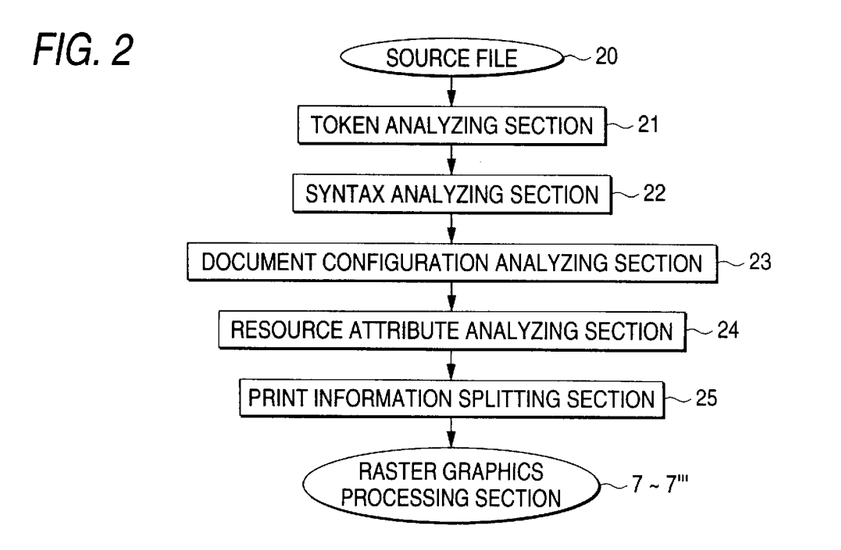
FIG. 2 is a schematic diagram that shows the detailed configuration of a print information pre-processing section 5 of the embodiment.

With reference to FIG. 2, the print information pre-processing section 5 of the print processing system that constitutes the principal element of the present invention will be described in detail. As shown in FIG. 2, the source file transmitted from the host computers 1, 1', . . . is a source code of the page-description language (hereinafter simply abbreviated to PDL) generated by a document processing application software (or a built-in driver) of the host computers 1, 1', . . . Interpress of Xerox Corporation that is one of the representative PDLs is used in the present embodiment.

[Token Analyzing Section]

To begin with, a source code 20 of the PDL is recognized as an operation command of a preset PDL and an operand necessary to execute that operation command by a token analyzing section 21. The token analyzing section 21 internally presents the source code in a train of tokens. One example of fully established and known techniques of analyzing these tokens is an analyzing technique disclosed in the book entitled "Compilers-Principles, Techniques, and Tools" by Aho, A., Sethi, R., and Ullman, J. D., published by Addison-Wesley, 1986. The detailed explanation of this technique will be omitted here.

[Syntax Analyzing Section]

The syntax analyzing section 22 structures the tokens generated by the token analyzing section 21 in the form of a syntax tree as the array of tokens pursuant to a syntax rule. As is the case of the token analyzing method, the syntax analyzing method is also publicly known. In general, an interpreter page-description language is sequentially interpreted and executed by a stack machine, and therefore it does not hold an individual syntax-tree representation. In the present invention, the source code is not sequentially carried out, but division of a command and optimization must be carried out in consideration of the overall print processing information. For this reason, the syntax tree must be represented as the basics of the print processing information. The print information that is analyzed by the syntax analyzing section in the form of a syntax-tree will be particularly referred to as a command sequence hereinafter.

[Document Syntax Analyzing Section]

[Semantic Analysis]

The command sequences formed by the syntax analyzing section 22 correspond to the setting of a value of environment information and individual drawing operations, respectively. Reconfiguration of the print information on a command sequence by command sequence unit results in excessively minute configuration of the print information. As a result, analysis for reconfiguration purposes becomes complicated and inefficient. To prevent such a problem, similar command sequences are grouped the present invention. The grouping of command sequences is easily effected by adopting a general semantic analyzing method. Of clusters of structured command sequences, the command sequences that describe the contents of drawing processing will be referred to as drawing contents, whereas the command sequences that define the conditions and resources of the drawing processing will be referred to as environment contents.

[Configuration Analysis]

After having formed contents, a document configuration analyzing section 23 analyzes the type, amounts, and manner of distribution of elements that constitute a document. During the course of this processing phase, the document configuration analyzing section 23 receives consecutive contents, or a content stream, and produces output of document configuration parameters into the stream of contents as a page header.

[Resource Attribute Analyzing Section]

Figure 5:
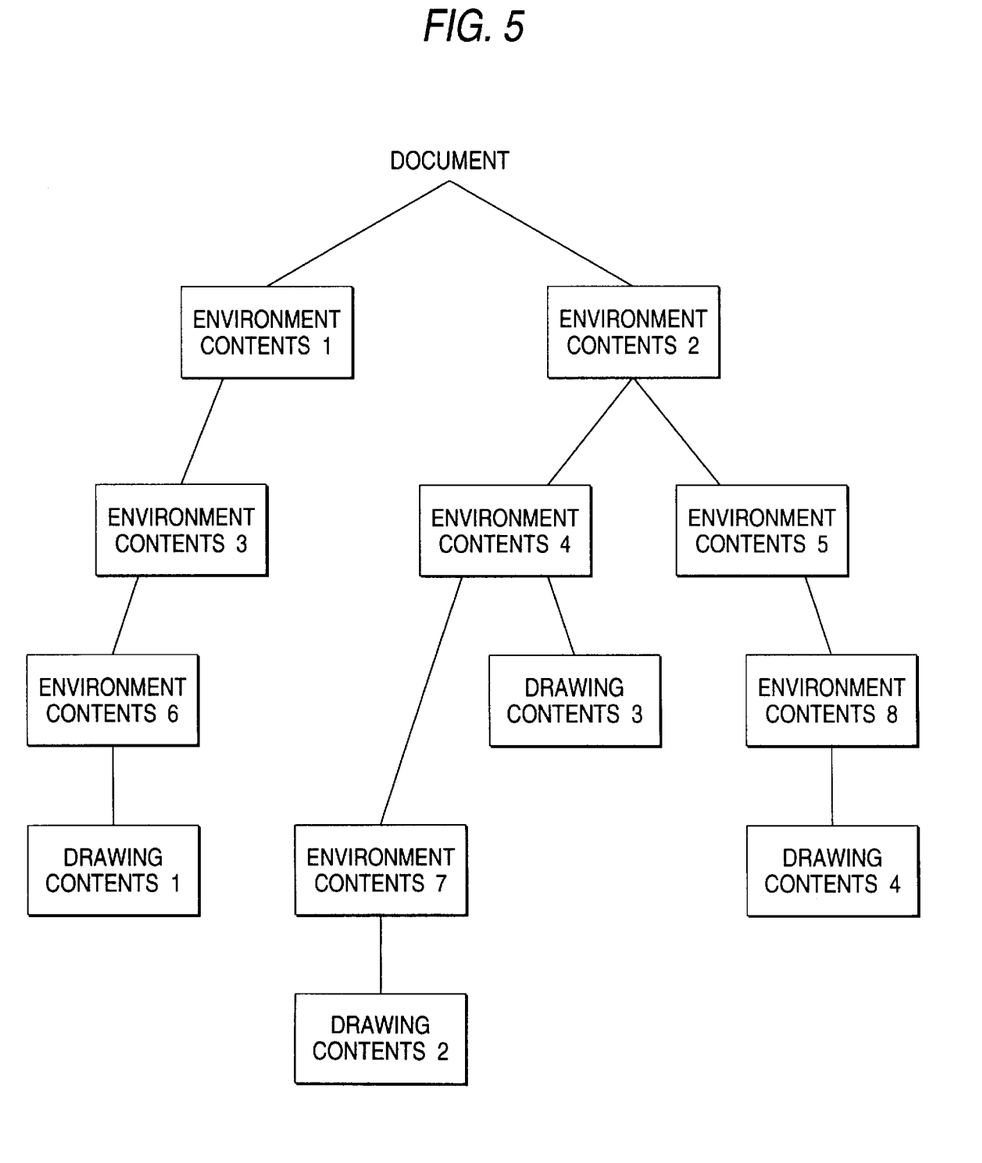
FIG. 5 shows the tree structure of a resource attribute list generated by the resource attribute analyzing section 24 shown in FIG. 4.

The document configuration represents the structure of a document itself, whereas the resource attribute hierarchically represents the resources necessary for subjecting the document to raster graphics processing: for example, font definition files, decoration character data, a color conversion table, and the relationship between these resources and the document. Consequently, the resource attribute information is one which represents the subordinate relationship, between environment parameters that show the setting of resources and the contents that show the configuration of the document, as syntax information. The resource attribute information extracted by the resource attribute analyzing section 24 is diagrammatically illustrated in such a spanning tree as shown in FIG. 5. The contents of the document are arrayed in the form of leaves of the spanning tree, respectively.

[Print Information Splitting Section]

A print information splitting section 25 divides the single print information transmitted from the client computer into a group of a plurality of partial print information items that are capable of independently being executed (the partial print information item will be hereinafter simply referred to as a job), on the basis of the information obtained by the document configuration analyzing section 23 and the resource attribute analyzing section 24. The job comprises drawing contents and environment contents required to execute these drawing contents. For this reason, the job will not be formed from the command sequences obtained as a result of division of the contents.

The job groups divided and produced by the print information splitting section 25 are distributed to the plurality of raster graphics processing sections 7, 7', 7", 7'", . . . , and the thus-distributed job groups are executed by them in a parallel manner. The distribution and processing of the job groups should be carried out so that the final job can be recovered as soon as possible. However, such a request is not an expression suitable for processing control purposes, and therefore heuristic standards which will be described later in detail are employed.

After having been processed by the raster graphics processing units 7, 7', 7", 7'", . . . assigned to the respective jobs, the jobs are recovered in the order in which they are produced. In other words, the jobs are recovered in the order in which they are produced in order to ensure the same image that is formed when the jobs are processed by a single raster graphics processing unit. This method is not the condition necessary to assure the completeness of an image to be formed (in other words, some order of arrangement of jobs does not need to be maintained). A processing mechanism is simple and easy to implement as procedures for assuring the completeness of an image. Further, the processing mechanism has the advantage of light-duty processing.

Each of the phases of the pre-processing of print information has been generally described. The document configuration analyzing section 23, the resource attribute analyzing section 24, the print information splitting section 25, and the method of recovering the image formed by raster graphics processing will be described in detail hereinbelow.

[Operation of Document Configuration Analyzing Section 23]

Figure 3:
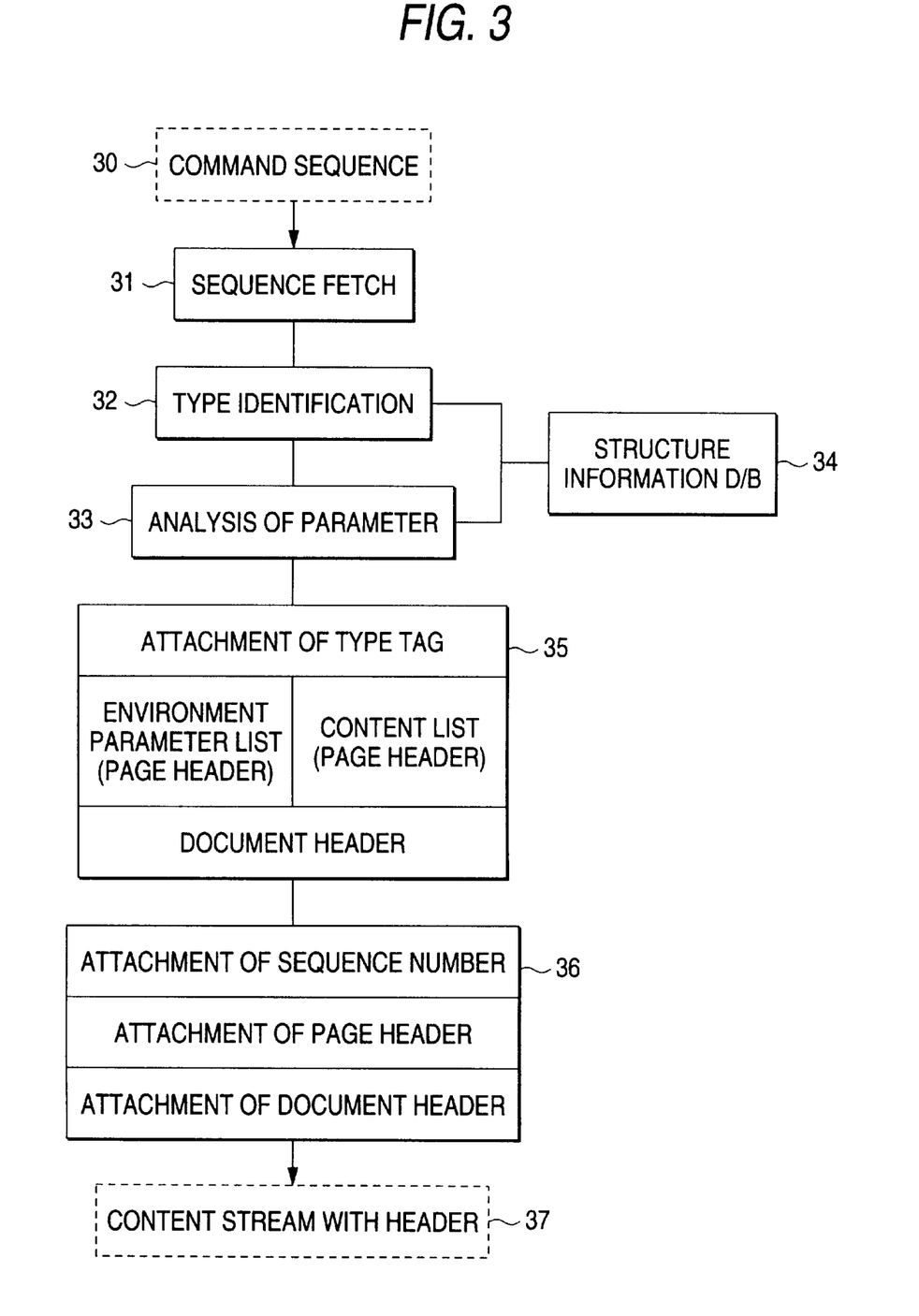
FIG. 3 is a schematic diagram that shows the detailed configuration of a document configuration analyzing section 23 of the above-described print information pre-processing section 5.

The operation of the document configuration analyzing section 23 will be described with reference to FIG. 3. Command sequences 30 generated by the syntax analyzing section 22 are fetched one after another in each step of a sequence fetch 31, and the thus-fetched command sequences are buffered. The thus-retained command sequences are checked against configuration information D/B (database) which structurally represents a command type list by a type identification section 32. After the type of command has been determined, the preset parameters of environment settings are checked by a parameter analyzing section 33 in the case where the command type is an environment setting. In contrast, in the case where a drawing is executed, the parameter analyzing section 33 checks an operand of the drawing operation. These two steps are continuously carried out until the currently fetched command sequence becomes different from the previously fetched command sequence in type. The consecutive command sequences are grouped into one content.

A type tagging section 35 attaches a type tag to each of contents, whereby the information about the type and amount of content existing in a predetermined page is attached to the content as a page header. The content is output when the completion of a page regarding a predetermined content is detected.

The environment contents required by the drawing contents or required to plot each specific drawing content are formed on the basis of a content formation rule. The stream of the command sequence input from the syntax analyzing section constitutes drawing contents and environment contents on a page-by-page basis according to the knowledge of structure information database. The structure information database has a register for holding the environment contents required to plot specific drawing contents. The leading edge of the command sequences received from the syntax analyzing section is a command for use in setting an environment using normal environment contents. The font information set by this command: for example, a font name, a font size, and a font style, is stored in the previously-described register. Drawing command sequences that are executed in the environment stored in the register follow the above-described leading edge. In the present embodiment, one environment content is formed when one environment command sequence is received from the syntax analyzing section. However, the formation of the environment content is not limited to the above-described way. For example, it is also possible to form one environment content using a plurality of environment command sequences.

The drawing command sequence comprises three types: namely, one which is used to draw characters, another which is used to draw graphics, and still another which is used to plot a line drawing. The drawing contents are specified to be formed from the same drawing environment. The same drawing environment means no changes in the font name, font size, and the font style. The stream of the command sequence is scanned in order from the first. Therefore, one drawing content is formed from the drawing command sequence of the same type from among the drawing command sequences received from the syntax analyzing section before a new environment command sequence is received in a scanning order.

The drawing contents include the environment information required to plot each of specific drawing contents. The drawing command sequence that should form the same drawing content is determined according to the above-described content formation rule, and the thus-determined drawing command sequence is stored in the register. The drawing environment that is common to the drawing command sequences are also contained in the drawing contents in order to constitute a content tree which will be described later.

In the present embodiment, it is necessary to distribute print information to a plurality of raster graphics processing units, to process that print information using the raster graphics processing units, and to recover the thus-processed print information from the raster graphics processing units. Where the print information is divided into a plurality of items, and where the thus-split print information items are independently processed, it is necessary to completely reproduce the print information so as to prevent the configuration of a page from becoming different from its originally intended configuration. Such complete reproduction of print information presents a problem in the case of spatial interference between drawing elements, that is, overlaps between image elements. Several countermeasures against this problem are conceived. The following simple method is employed in the present embodiment.

In other words, the stream of the contents formed by the document configuration analyzing section 23 is intended to maintain the chronological order of the contents even in the following processing. To this end, after tag information has been attached to each content, the number representing the order of generation (i.e., a sequence number) is attached to the content as a tag (36). This tag is maintained until the raster graphics processing is completed. When the content is recovered from each raster graphics processing unit, the recovery operation is carried out in the order of sequence numbers.

As a result of the above-described processing steps, the document configuration analyzing section 23 outputs a content stream 37 to which header information including a variety of tags is attached.

[Operation of Resource Attribute Analyzing Section 24]

Figure 4:
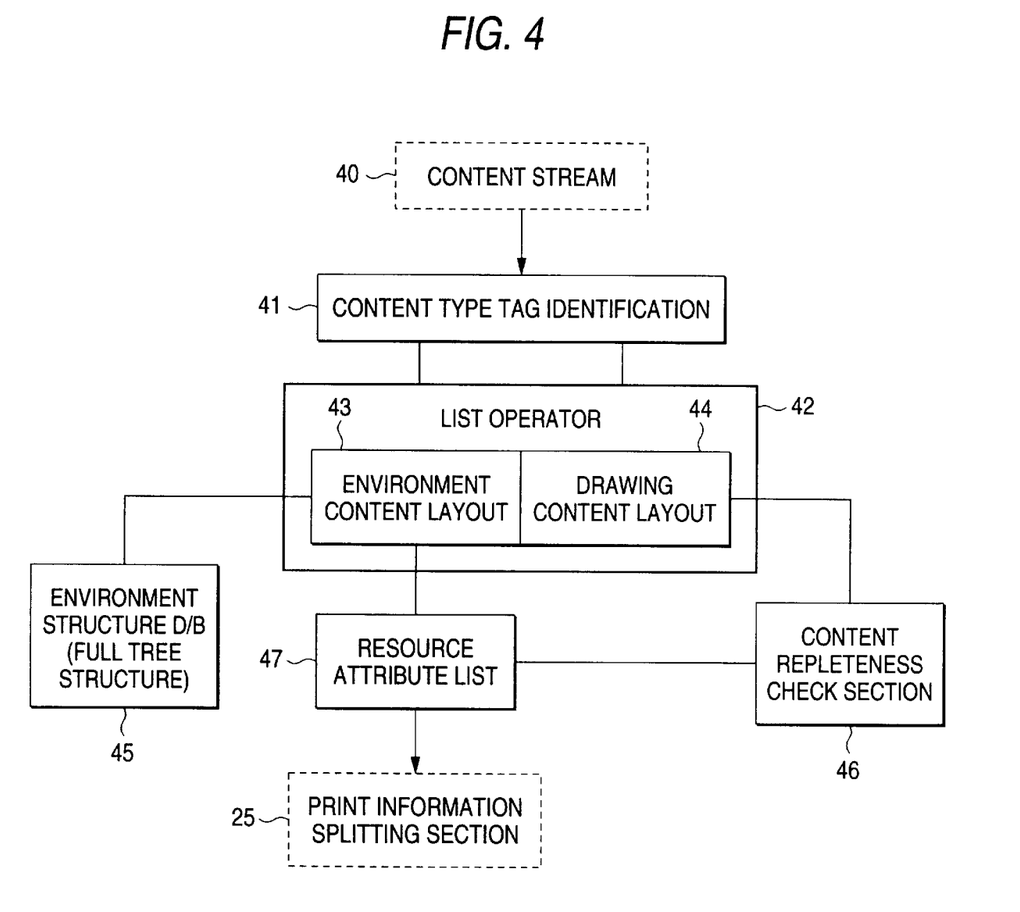
FIG. 4 is a schematic diagram that shows the detailed configuration of a resource attribute analyzing section 24 of the above-described print information pre-processing section 5.

The relationship between the contents formed by the document configuration analyzing section is analyzed by the resource attribute analyzing section 24. The thus-analyzed relationship is presented in a tree form (shown in FIG. 5). With reference to FIG. 4, the configuration and operation of the resource attribute analyzing section 24 will be described.

To begin with, the type of a content stream 40 input from the document configuration analyzing section 24 is identified by a content-type-tag identification section 41. The content is subjected to different processing operations depending on whether or not it belongs to environment contents or drawing contents.

A list operator 42 structurally represents contents in the form of a resource attribute list 47 in terms of the structural relationship between them. The list operator 42 consists of an environment content layout 43 and a drawing content layout 44. Where the type-identified content belongs to the environment contents, it is analyzed that the environment content of interest is a subset of what kind of environment contents by checking that content against an environment configuration database 45. The hierarchical relationship between the environment contents is written in the environment configuration database 45 with respect to all the types of environment content for use in setting the environment. The thus-analyzed environment content is arranged in a predetermined location in the resource attribute list, that is, the environment content layout 43 below the environment content that is immediately above the analyzed environment content.

Where the type-identified content belongs to the drawing contents, it is arranged below the environment contents necessary to execute that drawing content in the resource attribute list 47. In this case, however, the explicit expression of the necessary environment contents is not necessarily ensured. In other words, the previously declared environment conditions may be quoted. A content repleteness check section 46 checks whether or not the content is replete with the environment conditions. If it has been judged that the content is not replete with the environment conditions, missing environment conditions are assigned to the content as an upper environment content. Then, the content is arranged in the resource attribute list 47.

The thus-formed resource attribute list 47 is used as one of information items for use in splitting operations of the print information splitting section 25.

Figure 6:
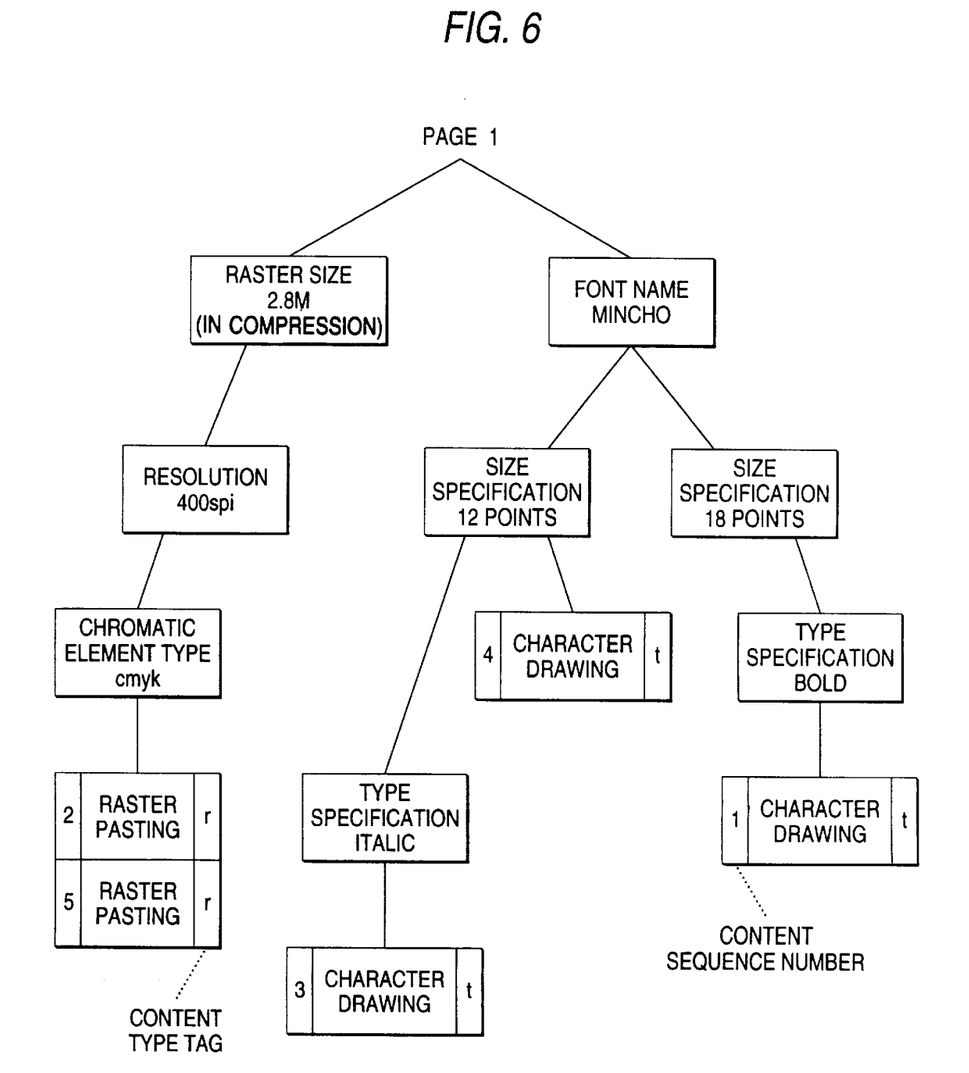
FIG. 6 shows the tree structure of one example of the resource attribute list shown in FIG. 5.

As a result of the repetition of the above-described resource attribute analyzing operations until the content stream is finished, the relationship between and configuration of the resources and the drawing operations related to the overall print information become explicitly described. FIG. 5 diagrammatically shows the resource attribute list, and FIG. 6 shows a specific example of the resource attribute list.

The environment information necessary for raster graphics processing can be described at high density without overlaps as a result of adoption of a tree structure as representation of the resource attribute information. The conditions required to execute the drawing content, or a basic unit to be processed, can be immediately made clear by completely covering environment parameters obtained as a result of backtracking from leaves to the root of the tree structure. By virtue of such characteristics, it is possible to immediately form a plurality of print jobs from the drawing contents. As a result, overhead associated with the parallel execution of the print jobs becomes slight.

Although the document configuration analysis and the resource attribute analysis are formed in different two phases in the present embodiment, they may be formed into single path processing which mixedly comprises these analysis operations. In such a case, although the control of the processing becomes complicated, a processing efficiency (i.e., a processing speed) is increased.

[Operation of Print Information Splitting Section 25]

Figure 7:
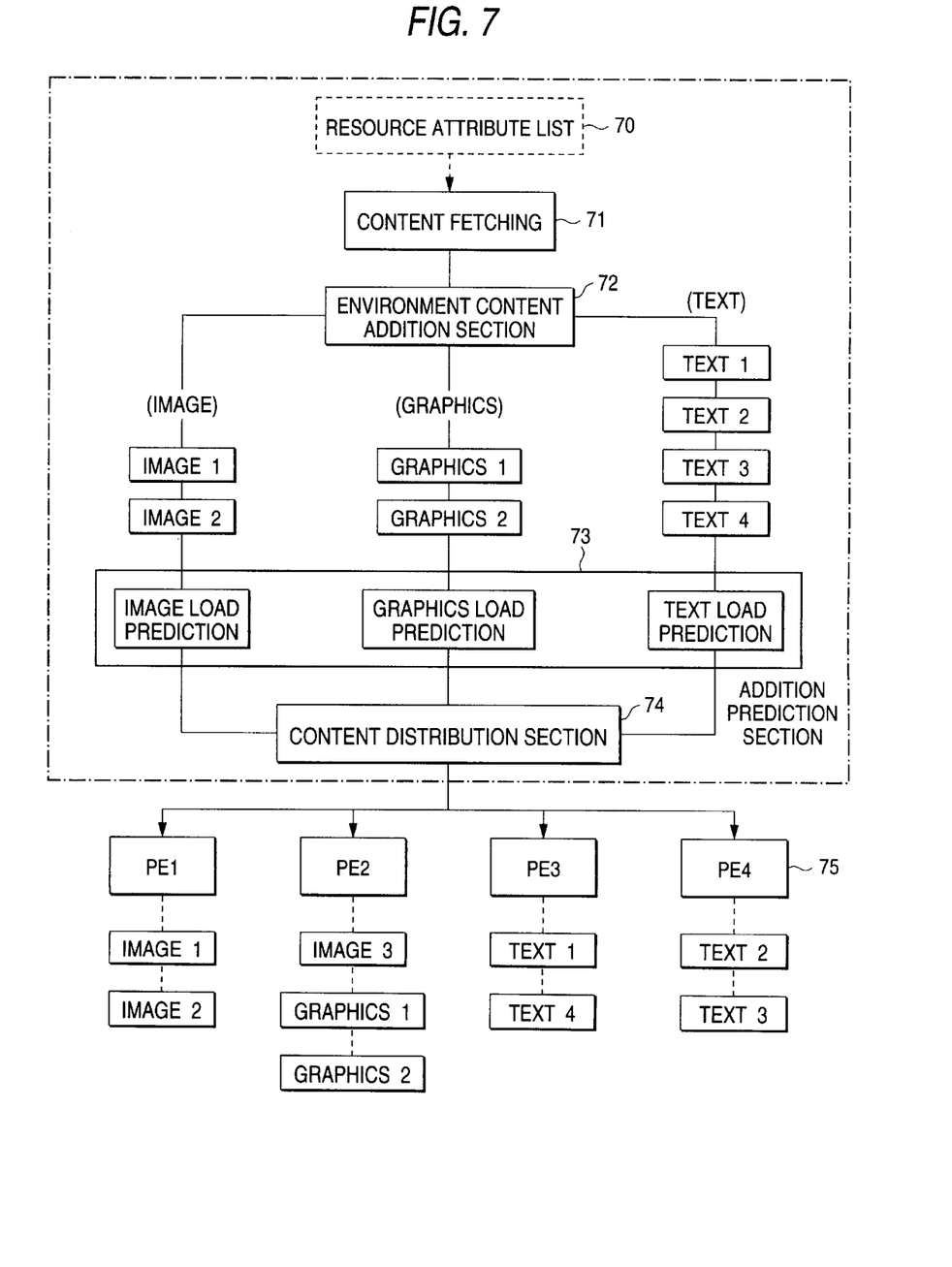
FIG. 7 is a schematic diagram that shows the detailed structure of a print information splitting section 25 of the above-described print information pre-processing section 5.

FIG. 7 diagrammatically shows the configuration of the print information splitting section 25. The print information splitting section 25 reads the resource attribute list and the drawing content one by one. Copies of the environment contents required to execute the drawing contents are attached to the drawing contents. The contents are then distributed to the plurality of raster graphics processing units. These operations will be described hereinbelow in order with reference to FIG. 7.

To begin with, the drawing contents in the resource attribute list 70 are read in the order of sequence numbers of the content tree (71). The reading of the drawing contents can be easily realized by holding a linear list that comprises only the leaves of the tree structure of the resource attribute list 70 arranged in the order of a content sequence.

On the basis of a content tree formation rule of the resource attribute analyzing section, a content tree shown in FIG. 5 is formed from the stream of the tagged drawing and environment contents received from the document. The environment information in order to implement the drawing content is represented by a mutually hierarchical content tree. For example, a font name is defined in the highest layer, and a font size is defined in the next highest layer. A font style is defined in the third highest layer. Each environment content is arranged in a predetermined location of the above-described predetermined hierarchical structure according to the details of the environment content. If an environment content 4 and an environment content 5 require the font name of an environment content 2, the environment content 4 and the environment content 5 are subordinate to the common environment content 2, as shown in FIG. 7.

As a result of the content tree being formed from all of the environment contents, the environment contents in the bottom layer are related to associated higher-level environment contents. The resource attribute analyzing section positions the drawing contents, which have the same environmental conditions as those of the cluster of the environments of the environment content in the bottom layer and an associated higher-level environment content, so as to be subordinate to the above-described environment content in the bottom layer. The environments of the drawing contents are the environment information stored in the previously-described register.

An environment content addition section 27 forms a cluster of contents, so that the drawing and environment contents are distributed to the raster graphics processing unit for each processing on the basis of the content tree. The cluster of contents formed for each processing comprises a specific drawing content and an environment content required to execute this drawing content, in other words, a specific drawing content and an environment content associated with the drawing content. In the case of the exemplary content tree shown in FIG. 5, the drawing content 1 and the environment contents 1, 3, and 6 constitute one unit to be processed. Further, the drawing content 2 and the environment contents 1, 3, and 6 constitute one unit to be processed. The drawing content 1 and the environment contents 7, 4, and 2 constitute one unit to be processed. The drawing content 3 and environment contents 2 and 4 constitute one unit to be processed. Finally, the drawing content 4 and the environment contents 2, 5, and 8 constitute one unit to be processed.

An environment content addition section 72 reads the environment information required to execute the previously read drawing content from the resource attribute list 70. A path is established so as to run from the drawing contents to the root. The environment information is completely extracted by covering all the environment contents along the path. The clusters of the drawing and environment contents formed by the environment content addition section will be hereinafter referred to as clusters of contents. A load prediction section 73 predicts the time required to process the thus-formed clusters of contents. A content distribution section 74 transmits each cluster of contents to the optimum raster graphics processing section (PE, processing element) 75 depending on the value of a predicted load.

Figure 8:
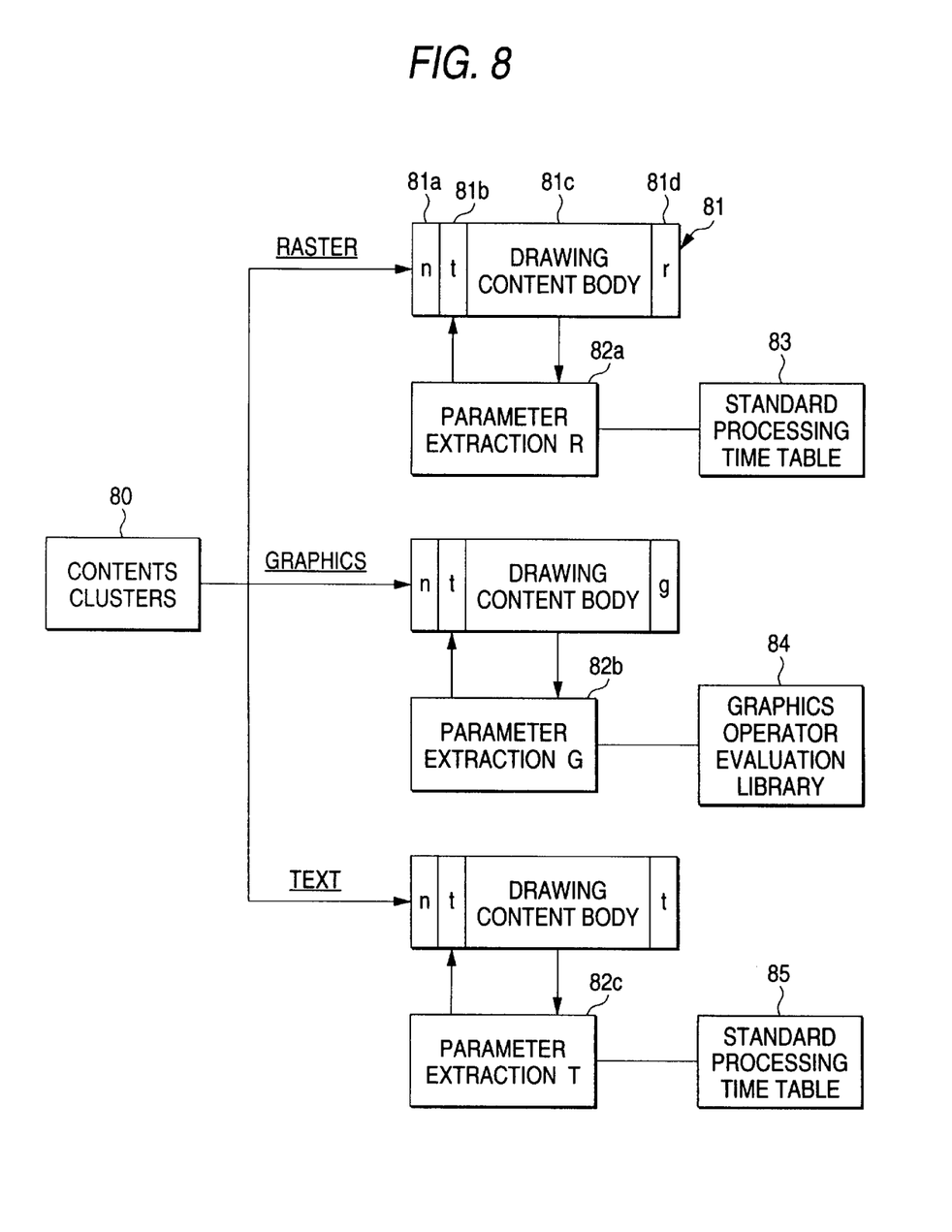
FIG. 8 is a schematic diagram that shows a load prediction operation carried out by the print information splitting section 25 shown in FIG. 7.

The processing of the load prediction section 73 will be supplementally described with reference to FIG. 8. For each cluster of contents 80, different load prediction operations are called depending on the type of drawing content included in the cluster. If the type of drawing content is a raster, a raster parameter extraction section 82a obtains parameters for predictions purposes such as a raster size or color conversion attributes. A processing time is predicted by means of the thus-obtained parameters and a prediction formula coefficient called from a standard processing time table 83. The thus-predicted processing time is added to a drawing content 81 as an addition tag 81b.

In contrast, where the type of drawing content is a graphics drawing, a graphics parameter extraction section 82b obtains drawing parameters such as coordinates. A prediction formula for use in making a next prediction is called from a graphics operator evaluation library 84. The thus-called prediction formula is executed while the drawing parameters are used as arguments.

Where the type of drawing content is a text, a text parameter extraction section 82c extracts parameters such as the type and size of font. Prediction coefficients associated with the parameters are called from the standard processing time table 85, whereby processing time is predicted.

In these three types of prediction, the preparation of the environment content itself may become different depending on the condition of the raster graphics processing unit that prepares the environment content. For example, if a predetermined cluster of contents are processed by a raster graphics processing section that is already provided with the font information to be used for that cluster, the preparation time required by the environment content will be reduced.

Therefore, the above-described predicted processing time is calculated depending on the condition of each raster graphics processing unit Pi. The thus-calculated processing time is attached to the header of the drawing content as an i-th order vector. Many of the conditions of the raster graphics processing unit Pi are overlapping. In other words, the probability the necessary environment content will not exist is high, and therefore it goes without saying that all of the overlaps need not to be calculated.

Figure 9:
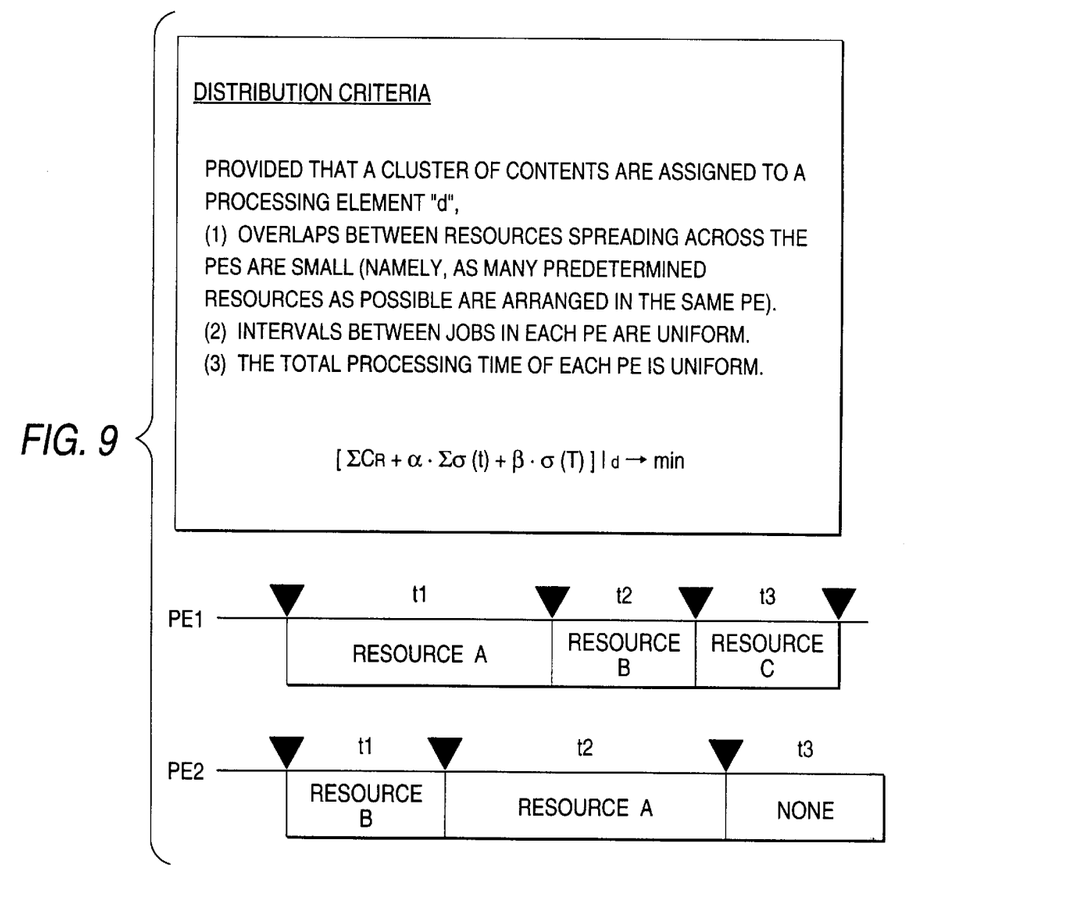
FIG. 9 is a diagrammatic representation of the operation of a print information distribution and recovery section 6 of the embodiment.

The cluster of contents whose processing time has been predicted in the previously-described manner are distributed and transmitted to the plurality of raster graphics processing units 7–7''' by the print information distribution and recovery section 6 (shown in FIG. 1). FIG. 9 is a diagrammatic representation of the control rule of distribution employed in the print information distribution and recovery section 6. The operation of the print information distribution and recovery section 6 will be described hereinbelow with reference to FIG. 9.

A processing program in which a cluster of contents are deemed as one job presents a very complicated problem in obtaining an optimizing scheme. If the processing program is completed calculated, high-speed print information processing that is the object of the present invention will not be attained. Therefore, as will be described later, a heuristic distribution control rule that does not require a vast amount of time required to perform scheduling calculations and provides a superior solution is employed in the present embodiment.

Perfect scheduling is intended to ensure "the earliest time to recover the final cluster of contents". However, as described above, optimum scheduling that completely implements the above-described object requires the considerably vast amounts of calculation. Therefore, three criteria capable of contributing to the optimum standards are adopted as heuristic rules. PEs (processing elements) used in the following descriptions signify the raster graphics processing units 7–7''' that carry out the raster graphics processing of the cluster of contents.

(1) Overlaps between resources spreading across the PEs are small (namely, as many predetermined resources as possible are arranged in the same PE).
(2) Intervals between jobs in each PE are uniform.
(3) The total processing time of each PE is uniform.

The above-described requirements are represented by the following equation (1) that minimizes the cost C required to render the cluster of contents abstract when the cluster of contents are assigned to a certain PE=d.

$$C = [\Sigma CdR + \alpha \cdot \Sigma n\sigma m(t) + \beta \cdot \sigma n(T)]|d \rightarrow \min \quad (1)$$

where CdR designates the total amount of the same environment contents that have been prepared by a plurality of PEs, "t" designates the stop time of the cluster of contents in each PE, σ(t) designates the dispersion of the stop time, "T" designates the total processing time of each PE, σ(T) designates the dispersion of the total processing time, a subscript "n" designates the number of PEs, a subscript "m" designates the number of clusters of contents in each PE, and α and β respectively designate balance constants of the predetermined terms.

A cluster-of-content distribution section calculates Equation (1) when each cluster of contents are distributed. As a result of this calculation, the target PE to which the cluster of contents are distributed is determined by selection of "d" that provides a minimum value. When the cluster of contents are distributed, the distributed environment contents are added to update the environment content list of each PE. This environment content list is utilized in the load prediction section.

[Recovery of Processing Results]

The processing of the clusters of contents that have been transmitted to the raster graphics processing units 7–7''' by the cluster-of-content distribution section 74 is started immediately after the processing of the cluster of contents currently being processed has been completed. A partial image resulting from the processing of the cluster of contents is compressed and retained together with a content sequence number. After the of distribution of the cluster of contents corresponding to one page has been completed, a partial image resulting from the processing is recovered in the order of content sequence numbers. The thus-recovered partial image is overwritten on page memory (not shown) in that order.

As described above, the order in which the command sequences are generated is retained during the course of distribution and recovery operations, as a result of which the completeness of an image is assured even when a plurality of raster graphics processing units execute raster graphics processing in a parallel manner.

As has been described above, by virtue of the present invention, resources to be processed are efficiently distributed to a plurality of raster graphics processing units when these raster graphics processing units process print information in a parallel manner. Further, by virtue of the present invention, pre-processing for dividing the print information in order to distribute the print information to the raster graphics processing units can be carried out without large processing overhead.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention.

The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A print processing system that carries out raster graphics processing in order to obtain pixel information for printing purposes from a source file which includes print information written in a predetermined print control language, the print processing system comprising:

a plurality of arithmetic processing units that execute the raster graphics processing;

token analyzing means that analyzes tokens of the source file and produces a print information command stream;

syntax analyzing means that analyzes the syntax of the print information command stream and sequentially produces a command sequence so as to constitute a meaningful unit in terms of the syntax rule of the print language;

document syntax analyzing means that analyzes the stream of the command sequence and sequentially integrates one or a series of command sequences into environment contents including a command sequence for specifying a drawing environment or drawing contents including a command sequence for specifying a drawing operation;

resource attribute analyzing means that analyzes the streams of the environment contents and the drawing contents and determines the raster graphics resource required to execute the drawing contents;

print information splitting means that allocates the environment contents and the drawing contents to the plurality of arithmetic processing units on the basis of the raster graphics processing resources determined by the resource attribute analyzing means; and printing means that carries out a printing operation according to the results of the processing of the plurality of arithmetic processing units.

2. The print processing system as defined in claim 1, wherein the print information splitting means comprises load prediction means that predicts the time required for each of the arithmetic processing units to subject a command sequence group to the raster graphics processing; and means for allocating the command sequences to the plurality of arithmetic processing units on the basis of the processing time predicted by the load prediction means and the information about the raster graphics processing resources.

3. The print processing system as defined in claim 1, wherein the information splitting means comprises count storage means for counting the order of command sequences output from the syntax analyzing means;

print information allocating means for allocating the command sequences to the plurality of arithmetic processing units together with the order information produced by the count storage means; and print image recovery means that recovers the results of the raster graphics processing and feeds them to the print means according to the command information attached to the command sequences when the command sequences are allocated to the arithmetic processing units after the processing of the allocated command sequences has been completed by the respective arithmetic processing units.

4. The print processing system as defined in claim 1, wherein the plurality of arithmetic processing units that carry out the raster graphics processing are tightly coupled by means of shared memory.

5. The print processing system as defined in claim 1, wherein the plurality of arithmetic processing units that carry out the raster graphics processing are loosely coupled through a communications network.

6. The print processing system as defined in claim 1, wherein the resource attribute analyzing means comprises means for determining the hierarchical structure between the environment contents according to a rule previously determined with regard to the hierarchical relationship between the drawing environments; and means for rendering the drawing contents, which have drawing environments identical with the drawing environments defined in a predetermined location of the hierarchical structure, to a predetermined location of the hierarchical structure of the environment contents determined by the hierarchical structure relationship determining means.

7. The print processing system as defined in claim 1, wherein the document configuration analyzing means comprises means for numbering the drawing contents in the order of the stream of the command sequences.

8. The print processing system as defined in claim 1, wherein the document configuration analyzing means has a content formation rule according to which one command sequence for specifying drawing environments is handled as one environment content, and according to which command sequences, comprising the same type of drawing operations and the drawing operations of the same environment, are grouped into one drawing content in the order of the stream of the command sequences.

9. The print processing system as defined in claim 1, wherein the document configuration analyzing means comprises a register for storing a specific drawing environment of one drawing content when the drawing content is formed according to the content formation rule; and means for changing the contents stored in the register to a specific drawing environment of another drawing content for the previously-described drawing content when the other content is formed.

10. The print processing system as defined in claim 9, wherein the document configuration analyzing means integrates a series of command sequences and the specific drawing environment stored in the register for the command sequences, into the drawing contents according to the content formation rule.

11. A pre-processing apparatus for use in a print processing system that carries out raster graphics processing in order to obtain pixel information for printing purposes from a source file which includes print information written in a predetermined print control language, the print processing system comprising:

token analyzing means that analyzes tokens of the source file and produces a print information command stream;

syntax analyzing means that analyzes the syntax of the print information command stream and sequentially produces a command sequence so as to constitute a meaningful unit in terms of the syntax rule of the print language;

document syntax analyzing means that analyzes the stream of the command sequence and sequentially integrates one or a series of command sequences into environment contents including a command sequence for specifying a drawing environment or drawing contents including a command sequence for specifying a drawing operation;

resource attribute analyzing means that analyzes the streams of the environment contents and the drawing contents and determines the raster graphics resource required to execute the drawing contents; and print information splitting means that allocates the environment contents and the drawing contents to the plurality of arithmetic processing units on the basis of the raster graphics resources determined by the resource attribute analyzing means.

12. A computer program product that runs on a computer and enables a plurality of arithmetic processing units to carry out raster graphics processing in order to obtain pixel information for printing purposes from a source file which includes print information written in a predetermined print control language, the improvement being characterized by the fact that the computer program product causes the computer to execute the following steps of:

analyzing tokens of the source file and producing a print information command stream;

analyzing the syntax of the print information command stream and sequentially producing a command sequence so as to constitute a meaningful unit in terms of the syntax rule of the print language;

analyzing the stream of the command sequence and sequentially integrating one or a series of command sequences into environment contents including a command sequence for specifying a drawing environment or drawing contents including a command sequence for specifying a drawing operation;

analyzing the streams of the environment contents and the drawing contents and determining the raster graphics resource required to execute the drawing contents; and allocating the environment contents and the drawing contents to the plurality of arithmetic processing units on the basis of the raster graphics resources determined by the resource attribute analyzing means.

13. A print processing method that enables a plurality of arithmetic processing units to carry out raster graphics processing in order to obtain pixel information for printing purposes from a source file which includes print information written in a predetermined print control language, the improvement being characterized by comprising the steps of:

analyzing tokens of the source file and producing a print information command stream;

analyzing the syntax of the print information command stream and sequentially producing a command sequence so as to constitute a meaningful unit in terms of the syntax rule of the print language;

counting the command sequences in the order in which they are produced;

analyzing the stream of the command sequence and sequentially integrating one or a series of command sequences into environment contents including a command sequence for specifying a drawing environment or drawing contents including a command sequence for specifying a drawing operation;

analyzing the streams of the environment contents and the drawing contents and determining the raster graphics processing resource required to execute the drawing contents;

determining the order of processing of the environment and drawing contents on the basis of the processing order that is decided with respect to the plurality of overlapping drawing contents and the raster graphics processing resource determined to be necessary to execute the drawing contents;

allocating the environment contents and the drawing contents to the plurality of arithmetic processing units on the basis of the raster graphics processing resources determined by the resource attribute analyzing means and the processing order determined by the dependency analyzing means; and recovering the results of the processing of the plurality of arithmetic processing units in the order of the count of the command sequences are counted and transmitting them to the print means.

* * * * *